United States Patent
Quintana Moraes

(10) Patent No.: US 12,096,827 B2
(45) Date of Patent: Sep. 24, 2024

(54) KIT FOR SOLIDIFYING BREAST MILK AND PROCESS FOR OBTAINING SOLIDIFIED BREAST MILK

(71) Applicant: Julia Quintana Moraes, Florianopolis (BR)

(72) Inventor: Julia Quintana Moraes, Florianopolis (BR)

( * ) Notice: Subject to any disclaimer, the term of this patent is extended or adjusted under 35 U.S.C. 154(b) by 416 days.

(21) Appl. No.: 17/425,624

(22) PCT Filed: Dec. 10, 2019

(86) PCT No.: PCT/BR2019/050533
§ 371 (c)(1),
(2) Date: Jul. 23, 2021

(87) PCT Pub. No.: WO2020/150798
PCT Pub. Date: Jul. 30, 2020

(65) Prior Publication Data
US 2022/0095752 A1    Mar. 31, 2022

(30) Foreign Application Priority Data
Jan. 25, 2019   (BR) .................. BR 102019001558-6

(51) Int. Cl.
*A44C 27/00*   (2006.01)
(52) U.S. Cl.
CPC .................. *A44C 27/001* (2013.01)
(58) Field of Classification Search
CPC ....... A44C 27/001; A44C 25/00; A44C 27/00; B29C 39/00; B29C 39/006
USPC ...................................... 264/4, 4.3
See application file for complete search history.

(56) References Cited

U.S. PATENT DOCUMENTS 3,901,833 A * 8/1975 Flynn .................. C08J 3/21
                                                524/904
3,940,528 A * 2/1976 Roberts .................. B29C 44/18
                                                428/161

FOREIGN PATENT DOCUMENTS

| CH | 714437 A2 | * 6/2019 |
| CN | 106263317 A | 1/2017 |
| CN | 107160935 A | 9/2017 |
| JP | H03266700 A | 11/1991 |

OTHER PUBLICATIONS

Como E Feito O Pingente De Leite Materno (Breast Milk Pendant) ½-Bangalo <la Pororoka: Dec. 19, 2017. Available on: < https://www.youtube.com/watch?v=3bm0UMWNoQ4 >, Access on: Dec. 19, 2019.
Donini, R. Farmaceutica gaucha cria pingente feito de leite materno. Primi Still: May 24, 2017. available on: <https://www.primistili.com.br/farmaceutica-gaucha-cria-pingente-feito-de-leite-materno>. Access on: Dec. 19, 2019.
Donini, R., "Pharmacist from Rio Grande do Sul creates pendant made of breast milk," Primi Still, May 24, 2017, video available on: <https://www.primistili.com.br/farmaceutica-gaucha-cria-pingente feito-de-leite-materno>. Accessed on: Dec. 19, 2019. Video transcript provided.

* cited by examiner

*Primary Examiner* — Galen H Hauth
*Assistant Examiner* — John Robitaille
(74) *Attorney, Agent, or Firm* — BACON&THOMAS,PLLC

(57) ABSTRACT

A kit for the solidification of breast milk and a breast milk solidification process using said kit are described, enabling the transformation of breast milk into a solid product through a chemical reaction, with the ratios of each qualitative element being properly controlled, and allowing lay users to obtain a molded solid product.

2 Claims, No Drawings

KIT FOR SOLIDIFYING BREAST MILK AND PROCESS FOR OBTAINING SOLIDIFIED BREAST MILK

FIELD OF INVENTION

The present invention patent describes a kit for the solidification of breast milk and the process of solidifying breast milk using said kit, enabling the transformation of breast milk into a solid product through a chemical reaction, with the ratios of each qualitative element being properly controlled, and allowing lay users to obtain a solid molded product.

INVENTION BACKGROUND

The solidification of breast milk for producing jewels is a technique that has been employed to perpetuate childhood and motherhood memories with a strong sentimental appeal.

The milk solidification process comprises a set of chemical reactions, and a solid product is obtained with antibacterial and antifungal characteristics, usually going through dehydration and grinding steps before being mixed with resin in order to provide a more durable and stable product for molding.

Document CN107160935 describes a method of solidifying breast milk by using a curing agent and a resin under heating, with stirring, application into molds, sanding after hardening, and creation of a handmade jewel.

Document CN106263317 describes a jewelry manufacturing process using breast milk as raw material. In this process, breast milk is vacuum sealed into a resin so that a jewel can be subsequently prepared.

Document CN105124873 describes an ornament made from breast milk and epoxy resin. Breast milk in solid state is coated with a translucent resin layer. A breast milk core is prepared by heat drying and demolding a mixture of epoxy resin, curing agent and breast milk at the weight ratio of 1 to 1.5 to 1.35. The translucent epoxy resin coating layer is prepared by mixing and heat drying the epoxy resin and a curing agent at the mass ratio of 2 to 1.

However, despite the technical solutions in the prior art, breast milk solidification processes generally require heating steps, use of vacuum and drying time, which makes it impossible for lay individuals to obtain pieces quickly, making it an expensive product and requiring that an amount of breast milk be supplied to obtain a solid product.

Thus, aiming to popularize the technique, facilitating operations, reducing costs and eliminating the need to supply a breast milk sample, the object of the present invention is a kit for breast milk solidification that includes solidifying agents at the appropriate ratio to perform said breast milk solidification process, providing a solid product that can be used for the production of jewelry or alike.

DETAILED DESCRIPTION OF THE INVENTION

The kit for solidification of breast milk, the object of the present invention, comprises a bisphenol A (2,2-bis(4-hydroxyphenyl) propane (BPA) aqueous solution at a concentration ranging from 57.0 to 65.0% v/v and a benzyl alcohol ($C_7H_8O$) solution at a concentration of 23 to 30% v/v, which will be mixed with breast milk Q.S. In addition, a mold is provided for molding and curing the end product.

In a first step, breast milk 5.0 to 20.0% v/v is mixed in a solution containing bisphenol A (2,2-bis(4-hydroxyphenyl) propane (BPA) at a concentration ranging from 57.0 to 65.0% v/v.

The mixture of breast milk and BPA is homogenized and then added to a benzyl alcohol ($C_7H_8O$) solution 23.0 to 30.0% v/v, and the final mixture is homogenized for approximately two minutes.

The resulting mixture is poured into a mold, kept for 24 hours for cure at room temperature, and subsequently removed from the mold.

The resulting piece undergoes a finishing step, with shavings being removed by sanding.

Optionally, inorganic materials are added to the mixture of breast milk, BPA and benzyl acid, such as glitter, beads, metal, among others, followed by the molding and curing step.

The invention claimed is:

1. A process of obtaining solidified breast milk comprising the steps of: a) mixing breast milk 5.0 to 20.0% v/v with a solution containing bisphenol A (2,2-bis(4-hydroxyphenyl) propane (BPA) at a concentration ranging from 57.0 to 65.0% v/v; b) adding a benzyl alcohol ($C_7H_8O$) solution 23.0 to 30,0% v/v; c) homogenization; d) pouring the resulting mixture into a mold and letting it stand for 24 hours for cure at room temperature; e) removal from the mold.

2. The process of obtaining solidified breast milk according to claim 1, further comprising a step of adding inorganic materials to the resulting mixture prior to the molding and curing step.

\* \* \* \* \*